UNITED STATES PATENT OFFICE.

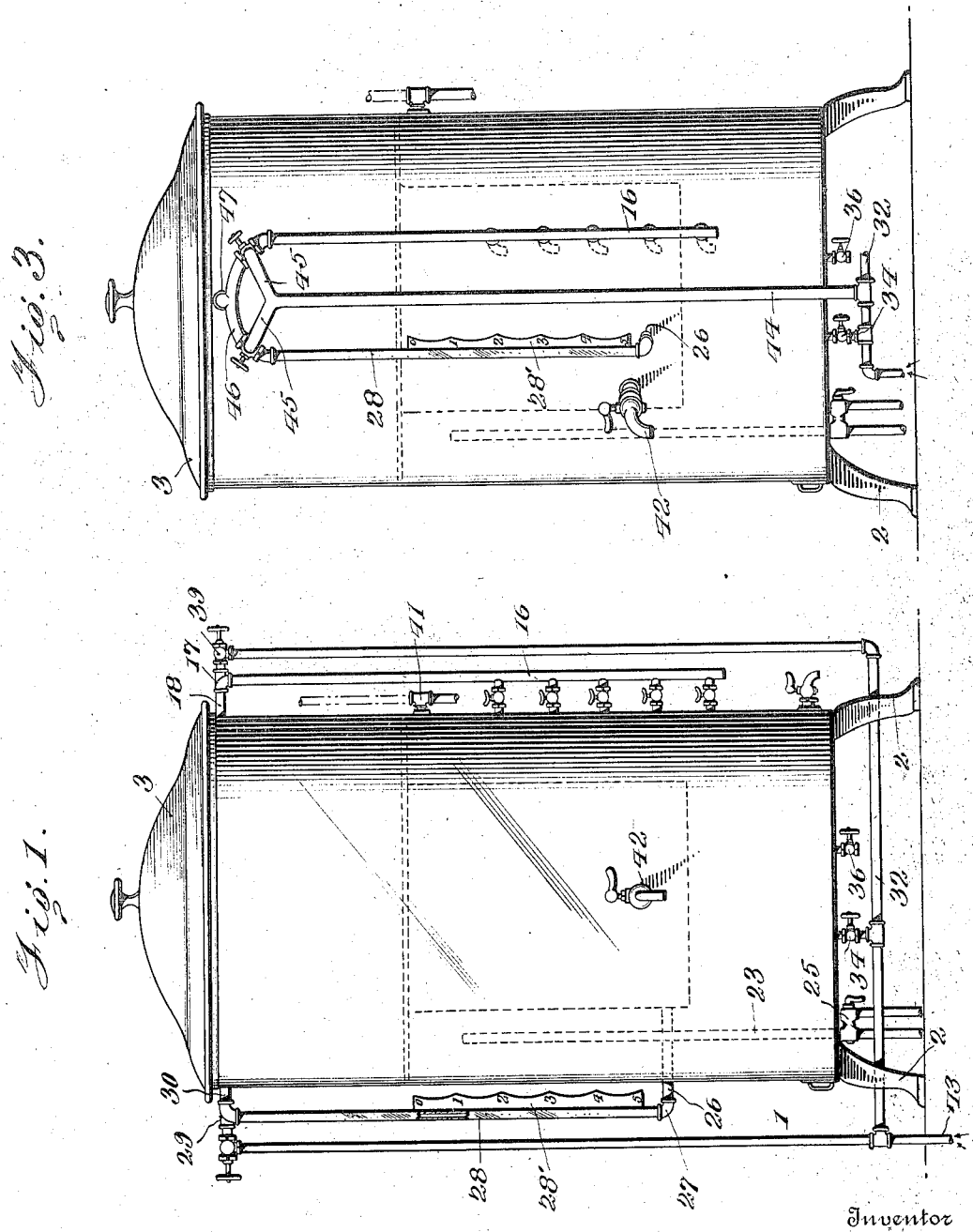

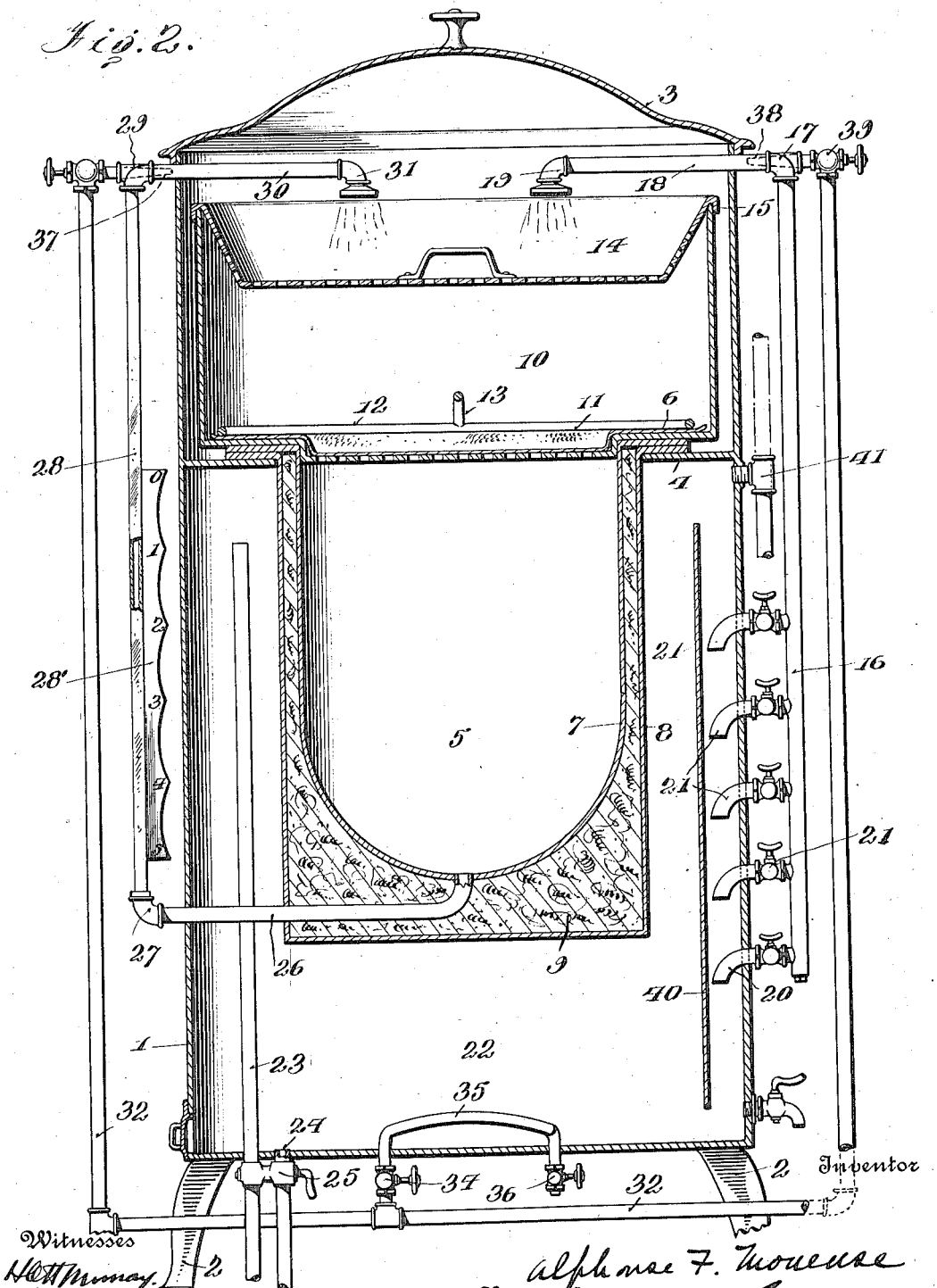

ALPHONSE F. MONEUSE, OF NEW ROCHELLE, NEW YORK.

COFFEE OR TEA URN.

1,029,392.  Specification of Letters Patent.   Patented June 11, 1912.

Application filed March 18, 1911. Serial No. 615,377.

*To all whom it may concern:*

Be it known that I, ALPHONSE F. MONEUSE, a citizen of the United States, residing at New Rochelle, in the county of Westchester and State of New York, have invented certain new and useful Improvements in Coffee or Tea Urns, of which the following is a specification.

This invention relates to improvements in coffee or tea urns.

Among the first advantages of the invention, is to improve in details, upon the construction shown and described in my copending application Serial Number 568,196, filed June 21, 1910, whereby the efficiency of the whole apparatus is increased and rendered very easy of manipulation by the attendant, to accomplish the various operations, incident to the use of an apparatus of this character. The principal feature of the present invention, however, resides in certain new and improved means for causing water to be withdrawn from the boiler and delivered to the percolator, the said means being situated outside of and independent of the boiler, in so far as the suction-force, necessary to effect the transfer of the water from the boiler to the percolator, is concerned, in contradistinction to the means described and shown in the application above referred to, wherein the means for causing the water to be withdrawn from the boiler is in communication with the boiler and receives the steam therefrom to induce the required suction force.

Another important feature of the present invention is the novel means for causing the contents of the beverage-receptacle to be circulated through the percolator at will, said means being separate and independent of the means by which the water is caused to be withdrawn from the boiler, and having no connection with the boiler, as is the case in the application heretofore referred to.

In the drawings, Figure 1 is a front view of the urn; Fig. 2 is a central section; Fig. 3 is an elevation showing a modified form of urn.

Referring to the drawings, the numeral 1 designates the urn body, supported upon suitable legs 2, as usual, and provided with a tight cover 3. Supported on a fixed ledge 4, near the upper part of the body, is a coffee or tea receptacle 5. This receptacle preferably is provided with an annular flange 6 which rests upon the ledge, whereby the receptacle is supported centrally in the body. Preferably the body of the coffee or tea receptacle is made with two shells, an inner shell 7 and an outer one 8, between which is placed suitable packing material 9. Supported on the ledge 4 is a percolator 10, for the reception of the coffee, tea or other material from which the beverage is to be made. Preferably the bottom of the percolator is covered with a strainer cloth or other suitable material 11, held in place by a ring 12, provided with a central bail 13 by which the ring may be conveniently lifted out, to renew or clean the strainer cloth, as the exigencies of the case may require.

The numeral 14 designates a dish-shape strainer cover, provided at its upper edge with a short flange 15, which normally rests upon the upper edge of the receptacle 10.

Suitably supported on the outside of the urn body, is a service pipe 16, provided at its upper end with an elbow 17, to which is attached a pipe 18, which extends into the urn for a considerable distance over the strainer cover and is provided at its forward end with a sprinkler nozzle 19. The pipe 16 is provided at its lower end with a faucet 20, and let into the body of the urn at a suitable distance above the bottom thereof and above this faucet, is a series of similar faucets 21, arranged at predetermined intervals. Each faucet is provided with a valve which may be independently manipulated to deliver boiling water from the boiler compartment 22 of the urn, through the service pipe 16, to the top of the urn, where it is delivered upon the strainer cover, through which it reaches the coffee or tea, and passes through the same to the beverage receptacle.

The numeral 23 designates an overflow pipe which extends into the boiler compartment of the urn, to a point some distance above the uppermost faucet 21, for a purpose which will presently become apparent. Adjacent to the lower end of the overflow pipe and also let into the bottom of the urn, is a short inlet pipe 24, and the outer ends of both of the pipes 23 and 24 are controlled by a double acting faucet 25, which, when turned, closes or opens the inlet pipe 24 and overflow pipe 23, simultaneously, as may be desired.

The numeral 26 designates a pipe which is let in through the side of the urn into the beverage receptacle. This pipe, on the outside of the urn is provided with an elbow 27, to which is attached a glass tube or pipe 28, carrying a plate 28', which is provided with suitable graduations, by which the height of the beverage in the receptacle may be ascertained from the outside of the urn. At its upper end this pipe runs into an elbow 29, to the inner end of which is connected a pipe 30, similar to the pipe 18. The pipe 30 is provided with a removable nozzle 31, through which the beverage, from the beverage receptacle, is delivered through the pipe 26 and pipes connected therewith, to a point above the strainer cover, thereby providing means for circulating the beverage through the coffee or tea in the percolator, above said receptacle, to increase the strength of the beverage, thus doing away with the necessity of drawing off the beverage and then manually repouring it over the coffee or beverage stock.

The means for circulating the beverage consists of a steam pipe 32 connected by a short valve connection 34, with a steam heating coil 35, located in the bottom or boiler space of the urn. This coil exhausts steam through a valve connection 36, extending to any suitable point. At the upper end of the pipe 32 is a valve controlled injector aspirator 37, the valve of which may be manipulated to permit steam to be forced through the pipe 30, creating a circulation of the beverage from the beverage receptacle, through the pipes 26 and 28 to the top of the urn, where it is delivered upon the strainer cover from whence it passes through the beverage stock into the receptacle, keeping up the circulation as long as the valve of the injector nozzle is kept open. The pipe 32 is continued beneath the urn and carried to the top thereof, and is provided with an injector 38, which is controlled by a valve 39. When the valve 39 is opened, water from the boiler compartment of the urn will be drawn out of the urn through any one of the faucets, that is opened, thus delivering the boiling water through the pipes 16 and 18, upon the coffee or other beverage-stock in the percolator.

Arranged inside of the urn is a partition 40. This partition is designed to shield the inner ends of the feeding faucets from the fluctuating level of the boiling-in the boiler compartment and the space between the partition and the wall of the urn is open at the top and bottom to permit the water to pass freely to the faucets. The partition may extend entirely across the urn body, close to one side thereof, or may simply be in the form of a guard, U-shape in cross-section, and developing the ends of the faucets.

Near the top of the urn I provide preferably a T-connection 41. To the upper end of this connection may be attached a pipe to convey the steam vapor to any convenient place and prevent its escape in the room, or, if preferred, to the lower end of the connection, a pipe may be attached, leading the vapor from the boiler space of the urn to a sink or other convenient or suitable exit.

The numeral 42 designates the usual draw-off faucet which, in the present construction runs in the beverage receptacle about right angles to the circulating pipe 26.

Steam for heating the coil 35 and for supplying the supply pipe 16, and steam pipe 32, may be supplied from any suitable source of steam supply and for this purpose, I have shown a short steam connection 43 let into a T-connection at the juncture of the vertical and horizontal sections of the pipe 32.

Referring to the modification shown in Fig. 3, the service pipe 16 and beverage circulating pipe 26 are arranged on the same side of the urn, and in this form, steam by which the circulation is caused, is fed through a single pipe 44, connected by valve controlled branches 45, each provided with an injector like 37. These extend into a curved connecting pipe 46 to which in turn is attached straight pipe 47 which extends into the urn and is provided with a nozzle, a suitable distance above the percolator.

In operation, the faucet 25 is opened, letting in the required amount of water in the boiler compartment of the urn. When the operator observes the water coming from the overflow, the faucet 25 is closed. This operation has placed in the boiler compartment, water, the level of which will be considerably above the top faucet 21, a gallon, two gallons or any predetermined quantity, according to the capacity of the urn. Assuming now that it is desired to draw off this water from the water compartment after it has reached boiling point, or to a condition for making the beverage, the valve of the top faucet is opened. At this time the valve 37 of the steam pipe 32 is opened, thus causing a suction that will draw the water from the boiler compartment down to and a little below the mouth of the top faucet 21. If an additional amount of beverage is required, the second faucet in the series from the top will be opened and the valve 39 will be again opened, causing the water between the mouth of the first and second faucets to be delivered through the service pipe 16 to a point above the percolator and so on down through the series of faucets. After the beverage has been made, and it is desired to strengthen the same, the valve at the top of the steam pipe 32 is opened, so that steam will be forced in through the nozzle 37, causing the suction through the pipes 26 and 28, thus delivering the beverage above the percolator and causing it to pass over the beverage stock therein, into the beverage receptacle. These operations will continue as long as may be desired or until the desired strength of the beverage is obtained.

In the forms shown in Fig. 3, when it is desired to circulate the beverage from the beverage receptacle through the beverage stock, the valve at the top of the pipe 28 is opened and the steam, passing through the pipe 44, from the branch 45, will cause a suction which causes the circulation. On the other hand, when it is desired to feed the water through the service pipe 16 it is obviously only necessary to close the valve on the opposite side and open the valve at the end of the service pipe, when the water will pass into the urn through the same pipe that the beverage has passed through, thus, in this instance, delivering boiling water for making the beverage in the first instance.

Having thus described my said invention, what I claim as new is:—

1. A coffee-urn, having in combination, a beverage receptacle, a percolater, a boiler, a service or feed-pipe in communication with the upper part of the urn and provided with a number of valved faucets in communication with the boiler, said faucets being arranged at predetermined intervals, a steam-pipe receiving a supply of steam from a source independent of the boiler and means whereby suction may be created in the service-pipe to withdraw a prescribed quantity of water from the boiler and supply it to the percolator.

2. A coffee urn, having in combination, a beverage receptacle, a percolator, a boiler, a service-pipe in communication with the upper part of the urn and provided with a number of faucets arranged at predetermined points and in communication with the boiler, a steam-pipe in communication with the service-pipe and receiving a supply of steam from a source independent of the boiler, and an injector aspirator situated in the steam-pipe for creating suction within the service-pipe whereby water may be withdrawn from the boiler and delivered to the percolator in prescribed quantities.

3. A coffee-urn, having in combination, a beverage receptacle, a percolator, a boiler, a service-pipe in communication with the upper part of the urn and provided with a number of suitably spaced faucets in communication with the boiler, a steam-pipe in communication with the service-pipe and receiving a supply of steam from a source independent of the boiler, an injector-aspirator controlling the communication, whereby suction may be created in the service-pipe to withdraw water from the boiler and deliver it in prescribed quantities to the percolator, and means for causing the beverage in the receptacle to be withdrawn and passed through the substance in the percolator to give additional strength to the beverage.

4. A coffee-urn, having in combination, a beverage receptacle, a percolator, a boiler, a service-pipe in communication with the upper part of the urn and provided with a number of suitably spaced faucets in communication with the boiler, a steam-pipe in communication with the service-pipe and receiving a supply of steam from a source independent of the boiler, an injector-aspirator controlling the communication whereby suction may be created in the service-pipe to withdraw water from the boiler and deliver it in prescribed quantities to the percolator, a circulating-pipe in communication with the beverage-receptacle and the upper part of the urn, said circulating-pipe being in communication with the steam-pipe; and an injector-aspirator for creating suction in the circulating-pipe, whereby the beverage may be withdrawn from the receptacle and discharged into the percolator and again passed into the receptacle.

5. A coffee-urn, having in combination, a beverage receptacle, a percolator, a boiler, a service or feed-pipe in communication with the upper part of the urn and provided with a number of valved faucets in communication with the boiler, said faucets being arranged at predetermined intervals, a partition shielding the inner ends of the faucets from the fluctuating level of the boiling water in the boiler, a steam-pipe, and means whereby suction may be created in the service-pipe to withdraw a prescribed quantity of water from the boiler and supply it to the percolator.

6. A coffee urn, having in combination, a beverage receptacle, a percolator, a boiler, a service-pipe in communication with the upper part of the urn and provided with a number of faucets arranged at predetermined points and in communication with the boiler, a partition shielding the inner ends of the faucets from the fluctuating level of the boiling water in the boiler, a steam-pipe in communication with the service-pipe, and an injector aspirator for creating suction within the service-pipe, whereby water may be withdrawn from the boiler and delivered to the percolator in prescribed quantities.

In testimony whereof I affix my signature in presence of two witnesses.

ALPHONSE F. MONEUSE.

Witnesses:
DANIEL F. SNOVER,
PETER A. HEALY.